(12) United States Patent
Yamamoto et al.

(10) Patent No.: US 6,417,127 B1
(45) Date of Patent: Jul. 9, 2002

(54) TRANSLUCENT POLYCRYSTALLINE CERAMIC AND METHOD FOR MAKING SAME

(75) Inventors: Hiroshi Yamamoto; Takashi Mitsuoka, both of Aichi; Satoshi Iio, Gifu, all of (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/574,202

(22) Filed: May 19, 2000

(30) Foreign Application Priority Data

| May 19, 1999 | (JP) | 11-138683 |
| Dec. 28, 1999 | (JP) | 11-374797 |
| Mar. 7, 2000 | (JP) | 2000-062627 |

(51) Int. Cl.$^7$ .............................................. C04B 35/10
(52) U.S. Cl. ...................................... 501/153; 501/127
(58) Field of Search .................................. 501/127, 153

(56) References Cited

U.S. PATENT DOCUMENTS

4,952,537 A 8/1990 Hayashi et al. ............. 501/127

FOREIGN PATENT DOCUMENTS

| JP | 3-261648 | 11/1991 |
| JP | 3-285865 | 12/1991 |
| JP | 2663191 | 6/1997 |
| JP | 2729204 | 12/1997 |

OTHER PUBLICATIONS

Yoshida, H., et al., "Improvement of High–temperature Creep Resistance in Fine–grained $Al_2O_3$ by $Zr^{4+}$ Segregation in Grain Boundaries", Philosophical Magazine Letters, 1997, vol. 76, No. 1, pp. 9–14.

European Search Report for EP 00304268 dated May 18, 2001.

K. Hayashi et al., "Transmission Optical Properties of Polycrystalline Alumina with Submicron Gains," *Materials Transactions, JIM,* Nov. 1991, vol. 32, No. 11, pp. 1024–1029.

M.R. Gallas, et al., "Fabrication of Transparent $\gamma$–$Al_2O_3$ from Nanosize Particles," *Journal of the American Ceramic Society,* vol. 77, No. 8, Aug. 1994, pp. 2107–2112.

Oh–Hun Kwon, et al., "Submicrometer Transparent Alumina by Sinter Forging Seeded $\gamma$–$Al_2O_3$ Powders," *Journal of the American Ceramic Society,* Feb. 1995, vol. 78, No. 2, pp. 491–494.

H. Mizuta et al., "Preparation of High–Strength and Translucent Alumina by Hot Isostatic Pressing," *Journal of the American Ceramic Society,* Feb. 1992, vol. 75, No. 2, pp. 469–473.

S. Kwon et al., "Consolidation of Nano–Crystalline Alumina," *Materials and Manufacturing Processes,* 1996, vol. 11, No. 6, pp. 969–985.

*Primary Examiner*—C. Melissa Koslow
(74) *Attorney, Agent, or Firm*—Sughrue Mion, PLLC

(57) ABSTRACT

An translucent polycrystalline ceramic capable of transmitting a visible light and excellent in strength, hardness, abrasion resistance, light transmittance, transparency and high-temperature characteristics and usable as a material, for instance, for cutting tools, outer tubes for high pressure sodium lamps and high temperature furnace window plates.

The translucent polycrystalline ceramic has at least one characteristic features that (1) a mean particle size of crystal particles formed inside the ceramic is not larger than 1.0 $\mu$m, (2) a mean aspect ratio thereof is from 1.0 to 1.5, (3) a density thereof is substantially a theoretical density, (4) a light transmittance through its thickness of 1 mm is at least 50%, (5) a mean facet length of crystal particles formed inside the ceramic is not longer than a maximum wave length of the light.

One of the embodiments is a translucent polycrystalline $Al_2O_3$ ceramic containing 0.02–2.0 mol % of oxide of metal belonging to IIIA and/or IVA group (excluding Ti), having its density of at least 3.98 g/cm$^3$, a mean crystal particle size of 0.3–1.0 $\mu$m, its bending strength of at least 1900 MPa and its Vickers hardness of at least 850 at 1000° C.

26 Claims, 4 Drawing Sheets

TRANSLUCENT POLYCRYSTALLINE CERAMIC AND METHOD FOR MAKING SAME

BACKGROUND OF THE INVENTION

1. Technical Field of the Invention

The present invention relates to a translucent polycrystalline ceramic and a method of making the same and in particular relates to a translucent polycrystalline $Al_2O_3$ ceramic and a method of making the same.

There are many applications of the translucent polycrystalline ceramic. For instance, an outer tube for a metal halide or sodium lamp, a light emitting tube and a window plate for high-temperature furnace are made of translucent alumina ceramic, wherein not only a electrical resistance and/or chemical corrosion resistance, but also a high strength and hardness from low temperature (ambient) up to as high as 1000–1200° C. are often required. This is partly because the translucent alumina ceramic may be thinned to gain more light transmittance therethrough. In addition to a high straight-line light transmission or rather called as liner-light transmittance (corresponding to transparency), some applications need a fine texture and high abrasion resistance (namely ceramic particles does not fall off from its surface maintaining a smooth and less roughness surface). Such applications includes optical connectors, optical filters, medical articular heads in medical use, cutting tools, bearings, high-Q dielectrics for some electronic components.

2. Related Arts

It is known that some alumina ceramics (polycrystalline) can be made translucent or partially transparent, in other words, light-transmittable therethrough.

However, the translucent alumina ceramic that satisfies both transparency and high mechanical strength has not been reported. For example, in Japanese Patent Laid-Open No. H03-285865/1991, a translucent alumina ceramic made by using alumina grains of high-purity (99.99% purity) and a small amount of MgO is disclosed, however, its bending strength is insufficiently low as about 500 MPa. On the other hand, in other Japanese Patent Nos. 2729204 and 2663191, the translucent alumina ceramic having high strength and hardness made by controlling a mean particle size under HIP is disclosed, however, a straight-line transmission of light propagating through a thickness of 1 mm thereof is insufficiently lower than 50%.

In addition, it has been conventionally considered that large particle sizes of alumina crystal grains constituting the alumina ceramic contributes to gaining a high translucency or transparency of the alumina ceramic because chances of light-scattering(:reflection and/or refraction occurring at grain boundaries by the light) are reasoned to be lesser than the alumina having much smaller grains inside.

In the conventional translucent alumina ceramic, alumina particles constituting the polycrystalline alumina ceramic are liable to fall off from its surface. In other words, it has been difficult to attain a precisely or rather extremely mirror-polished surface of the translucent alumina ceramic. When the conventional translucent alumina ceramic is subjected under a large contact-stress as in use for bearings or cutting tools or even in a surface polishing process thereof, such a stress-concentrated site thereof tends to break, probably due to large size crystals are formed with magnesia (MgO) binding the crystals inside the conventional translucent alumina ceramic.

SUMMARY OF THE INVENTION

An object of the invention is therefore to provide a translucent polycrystalline ceramic having a good strength and hardness, capable of transmitting a light through the ceramic.

Another object of the invention is to provide a translucent polycrystalline alumina ceramic having excellent strength and hardness or abrasion resistance, capable of light transmittance and/or straight-line light transmission therethrough and withstanding a high temperature.

Still another object of the invention is provide a method of making a translucent polycrystalline alumina ceramic. This method enables manufacture of an excellent translucent alumina ceramic having high temperature bending strength and hardness and/or abrasion resistance, wherein particles/grains constituting the ceramic are hard to fall off from its surface and the surface can be ground and polished into a smooth surface with less surface roughness and be mechanically less injured for instance under a high contact stress applied to the ceramic in use maintaining its translucency.

In a first embodiment of the invention, there is provided a translucent polycrystalline ceramic capable of transmitting a light that enters the ceramic, comprising crystal particles, wherein a mean facet length of the crystal particles is not longer than a maximum wave length of the light that transmits through the polycrystalline ceramic product; the mean facet length being defined as an average of lengths of sides forming polygons that appear in cross sections of the crystal particles constituting the ceramic.

A characteristic feature of the translucent polycrystalline ceramic according to the invention is that the mean facet length as defined above is shorter than a maximum wave length of the light that transmits through the translucent polycrystalline ceramic.

In an aspect, in the case that a visible light that has a wave length of about 380–780 nm, if all of the facet lengths (meaning facet side lengths of the alumina crystal particles) are less than 380 nm, highest translucency of the polycrystalline ceramic transmitting most of the visible light is attained with the translucent polycrystalline ceramic. Even when the mean facet length(meaning an average of the facet side lengths of the crystal particles) is less than 700 nm, the translucent polycrystalline ceramic with thickness of 1 mm can transmit more than 50% of the visible light therethrough, as will be later described in detail.

When the facet length is shorter, the better translucency and transparency is attained, and this is in contrast to the conventional technology that requires larger particles or grains (resulting in longer facet lengths) for attaining a better translucency through the ceramic.

In a preferred embodiment of the invention, the best translucency is attained when all the facet lengths are shorter than all wave lengths of the lights that transmit through the ceramic. The better light translucency as high as 70% is attained with the mean facet length of less than 500 nm and the best one (more than 75%) is attained with that of less than 400 nm.

In another preferred embodiment according to the invention is that the polycrystalline ceramic should is substantially poreless. In other words, a relative density of the fired ceramic should be at least 99.8% or substantially 100% with a minimum binder connecting the transparent crystal particles (or grains) formed inside the translucent ceramic. This is because the pores decrease translucency and/or transparency of the polycrystalline ceramic, and in addition decreases strength and hardness thereof. In the case of a translucency polycrystalline alumina ceramic, the density thereof should be at least 3.98 g/cm$^3$ (substantially 100% in relative density).

A material candidate for the crystal particles is $Al_2O_3$, AlN, $ZrO_2$, spinel and so on, so long as large optical anisotropy or crystal anisotropy is not formed with the crystal particles. In other words, if a mean aspect ratio of the crystal particles is 1–1.5 (preferably 1–1.3) and a mean particle size of the crystal particles formed inside the ceramic is not larger than about 1 μm, the mean facet length becomes less than the maximum wave length or most of wave lengths of the visible light. Among them, $Al_2O_3$ (alumina or sappier) is best selected for the crystal particles. Because a crystal structure of the alumina belongs to a hexagonal system, difference of refractive index for the light between its crystal facets formed along a-axis and c-axis in crystallography is theoretically only about 0.008, which renders the reason why majority of the visible light can transmit through the translucent polycrystalline ceramic comprising crystal particles having the mean aspect ratio of 1–1.5 and the mean crystal particle size of not larger than 1 μm.

In an aspect of the invention, the translucency of $Al_2O_3$ ceramic (namely, alumina including sapphire) as well as strength and hardness of the ceramic at high temperature are maintained as will be described later in detail, if a metal oxide is selected from oxides of metals belonging to IIIA and IVA groups of Periodic Table (IUPAC alt) excepting Ti and is added as a binder for binding or rather a sintering aid for sintering the crystal particles inside the ceramic. Ti is substantially excluded since a colorless or non-pigmented translucency is not obtained with the alumina ceramic containing Ti at its boundary. Other pigmenting element such as Cr and Co (although not belonging to IIIA and IVA groups of the Periodic Table) is substantially also avoided for the binder or sintering aid.

Most preferred theoretically is that the translucent polycrystalline alumina is a sintered product that is made without such a sintering aid or binder. In actual practice, the ratio of alumina occupying the translucent alumina ceramic (meaning a relative content of alumina in the sintered ceramic product) is made preferably to at least 99% or more preferably at least 99.95% in volume. To attain this, a starting material powder of alumina is selected preferably from those having the purity of not less than 99.99% or not less than 99.995% (best).

If colored translucent polycrystalline alumina ceramic is required in a application such as an optical filter, a very small amount of the pigmenting elements should be selectively added.

A soft metal oxide such as magnesia(MgO) that is conventionally used as a colorless sintering aid or binder for sintering the $Al_2O_3$ crystal particle is not recommended to be used, in the case that the strength and hardness of the translucent alumina ceramic at high temperature as high as 1000° C. is required. This is because the MgO binder can rapidly reduces the strength and hardness at such an elevated temperature. In addition, use of the MgO binder causes the crystal particles to come off from the translucent alumina ceramic surface, rendering difficulty in attaining a smoothly polished surface of the ceramic. If in an aspect, a fine or smooth surface finish of the ceramic is not attained by polishing, the translucency of the ceramic is affected simply because of a correlation existing between a surface smoothness and translucency of the ceramic.

Since the mean particle size of the crystal particles in the translucent polycrystalline ceramic should be controlled to be small as not exceeding 1 μm, a strong and hard binder for binding the crystal particles is necessary; and that is one of the reasons why the oxide of metals belonging to IIIA and/or IVA groups of the Periodic Table is used for the translucent polycrystalline alumina (including sappier) according to the invention. For instance, $Y_2O_3$, $Yb_2O_3$, $ZrO_2$, $Sc_2O_3$, $La_2O_3$, $Dy_2O_3$ and $Lu_2O_3$ are recommended; and among them $Y_2O_3$ and/or $Yb_2O_3$ perform best.

In an aspect of the invention, an amount of the metal oxide(s) included in the transparent polycrystalline ceramic is in an amount of less than 2% in molarity (2 mol %). In order to attain the highest density of the translucent ceramic with this small amount of the metal oxide above and to attain strength and hardness, as will be described later, the ceramic is sintered under HIP (hot isostatic pressure) so that the crystal facet and the crystal particles are controlled in length and size respectively during firing (sintering) at comparatively low temperature.

Therefore, in an aspect of the invention, there is provided a translucent polycrystalline ceramic capable of transmitting a visible light that enters the ceramic, comprising $Al_2O_3$ crystal particles and a metal oxide between the crystal particles, wherein a relative density of the translucent polycrystalline ceramic is not less than 3.98 g/cm$^3$ (or preferably 3.99 g/cm$^3$ that is very close to its theoretical density); a bending strength of the translucent polycrystalline ceramic is more than 750 MPa; and a Vickers hardness of the translucent polycrystalline ceramic is more than 1900; and the metal oxide is an oxide of one or more metals selected from the metals belonging to IIIA and/or IV groups of the Periodic Table excluding Ti.

A better performance of the translucent polycrystalline alumina ceramic is attained if the metal oxide contained therein is 0.02–2.0% in molarity and a mean particle size of the crystal particles is 0.3–1.0 μm, according to an aspect of the invention. Namely a bending strength and a Vickers Hardness thereof becomes at least 500 MPa and at least 850, respectively, measured at a temperature of 1000° C.

This translucent polycrystalline ceramic according to the invention is capable of more than 50% of the light having a wave length of from 380–780 nm can transmit through the translucent polycrystalline ceramic when a thickness of the ceramic is 1 mm.

Further, the translucent polycrystalline ceramic has a feature of a straight-line light transmission ratio of at least 0.3 (or 30% in percentage), which straight-line light transmission ratio is determined by dividing the light intensity transmitted through the ceramic in less than 0.5 degree angle by a total light intensity originally entering the ceramic when the ceramic is 0.5 mm in thickness and the light has a wave length of 380–780 mm.

A surface of the above translucent polycrystalline alumina ceramic according to the invention is so hard that the surface can be polished to an extent that a center line mean surface roughness (Ra) is from 0.002 to 0.020 μm and a maximum height (Rmax) of the surface roughness is less than 0.30 μm and/or to the extent that an empty surface area caused by the alumina particles fallen off from the surface to the total polished surface area is not higher than 1%.

Since the translucent polycrystalline alumina according to the invention has a high corrosion-resistance, it can be used for e.g. an outer tube of a sodium lamp wherein a high sodium vapor pressure is confined. This translucent polycrystalline alumina ceramic has a very high strength and hardness, it can be used for a cutting tool having an edge formed by a rake face and a flank face, or for a abrasion resistance field including bearings. Since an electrical performance is expected similar to sappier, this polycrystalline ceramic may be used as a dielectric material in various electronic components, especially in a high frequency field.

In an embodiment according to another aspect of the invention, a preferable mean particle size of alumina crystal particles constituting the translucent alumina ceramic is from 0.3 to 0.7 μm. When the mean particle size of the alumina crystal particles exceeds 1.0 μm, the strength and hardness of the sintered alumina particle reduces rapidly, possibly resulting in a comparatively low abrasion resistance ceramic and causing crystal particles to fall off during a surface polishing, which will injure the surface or weaken the ceramic under e.g. a continuous contact stress.

There is expected no serious problems in the properties such as strength, harness, abrasion resistance and light transmittance in the translucent polycrystalline ceramic, since it may be theoretically better in view of translucency and transparency the crystal particles and the facet lengths are controlled to be smaller than 0.3 um in size and less than 200 nm in length respectively. However, there may be a drawback that such fine particles are hard to be processed resulting in high cost for the sintered ceramic.

For cutting tools, at least 750 MPa (or more than 830 MPa or in some cases more than 1100 MPa) in bending strength and at least 1900 (more preferably more than 2100) in a Vickers hardness are normally required. The translucent polycrystalline ceramic according to the invention satisfy such requirements for cutting tools. In addition, since the alumina crystal particles are make as having a small aspect ratio of from 1.0 to 1.5, the sintered product containing the crystal particles is excellent in the abrasion resistance as well as the high strength and the high hardness. If the aspect ratio is controlled to 1.0 to 1.35, not only the abrasion resistance but also straight-line light transmittance relating to transparency of the ceramic are highly maintained.

BRIEF DESCRIPTION OF THE DRAWINGS

FIG. 6(a) and FIG. 6(b) are schematic cross-sectional views showing that a mean facet length of crystal particles formed in the polycrystalline ceramic is an important factor for translucency/transparency of the polycrystalline ceramic, wherein FIG. 6(a) shows that the mean facet length is longer than a wavelength of a light transmitting with scattering (reflection/refraction), while FIG. 6(b) shows that the mean facet length is below the wavelength of the light transmitting with less light scattering compared to FIG. 6(a).

DETAILED DESCRIPTION OF THE INVENTION

The light transmittance or transmission through the ceramic is measured by, for example, a way described later in Example 1.

In an aspect of the invention, the polycrystalline alumina ceramic according to the invention is characterized in that the mean facet length of the alumina crystal particles constituting the sintered product is not longer than 700 nm. The mean facet length is preferably not longer than 500 nm, and more preferably not larger than 400 nm, which depends on how much translucency/transparency is required for the ceramic in actual use. The mean facet length is preferably as small as possible from the view point of the transparency (:non scattering of the light). When the mean facet length is not longer than 100 nm, a creep-change by the grain boundary diffusion at a high temperature may be liable to occur, when use of the ceramic product at such a high temperature as close to the sintering temperature of the ceramic product is in consideration. In the above range of less than 700 nm, the translucent alumina ceramic shows excellency in the transparency (namely, light-transmittable with less scattering) and can be usable for a lamp tube having a point light source inside, since it is preferred that the ratio of the scattered light to the linearly transmitted light is preferably small for the point light source.

The translucent polycrystalline alumina ceramic according to the invention shows a total light-transmittance (namely, a rate of out-transmitted light intensity (I) divided by the intensity (Io) of the light originally entering to the ceramic) shows at least 60%, 70% or in some ceramic at least 75%, in the case that the thickness of the ceramic is 0.5–1 mm. Further a linear light-transmittance (namely, transmission rate of a light scattering through the ceramic in an angle of less than 0.5 degree from its straight line axis of the light originally entering the ceramic) is at least 0.15 (15% in percentage), 0.2–0.3 (20–30%) under a better measurement condition or at least 0.4 (40%) under a best measurement condition, depending on a measurement apparatus available in the market. Also, a ratio of the linear light-transmittance to the total light-transmittance is at least 0.30, at least 0.4 under the better measurement condition or at least 0.5 under a best condition depending on a measurement apparatus available in the market. Herein, the linear light-transmittance means the same as the straight line light-transmission.

Figure 6:
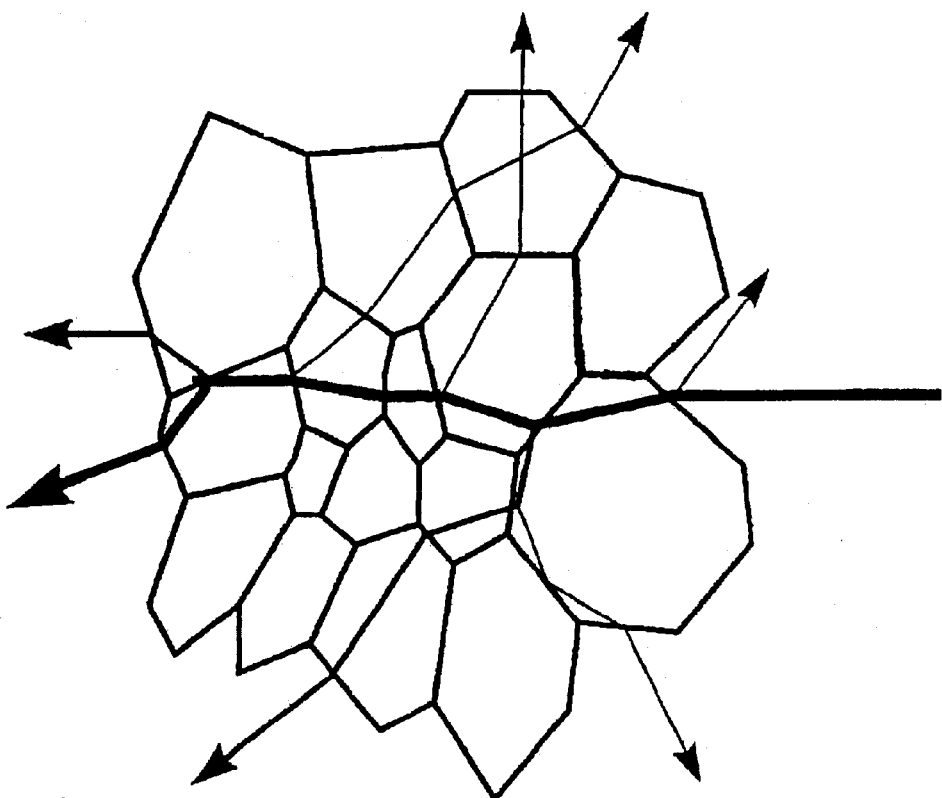
Figure 6:
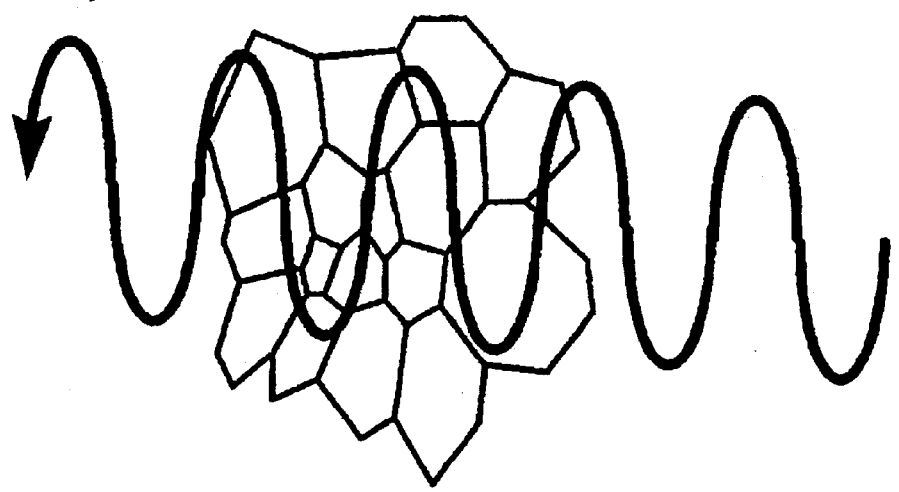

A facet length of a crystal particle is herein defined as a length of side of each plane constituting a polyhedron of the crystal particle that is surrounded by grain boundaries in the sintered product as shown in FIGS. 6(a) and 6(b). The length of the side can be measured by for example, a SEM photograph. A mean facet length is a mean value of the lengths of the sides measured in plural crystal particles (preferably based on at least 100 particles). The term "facet" means a plane constituting a polyhedron.

Figure 7:
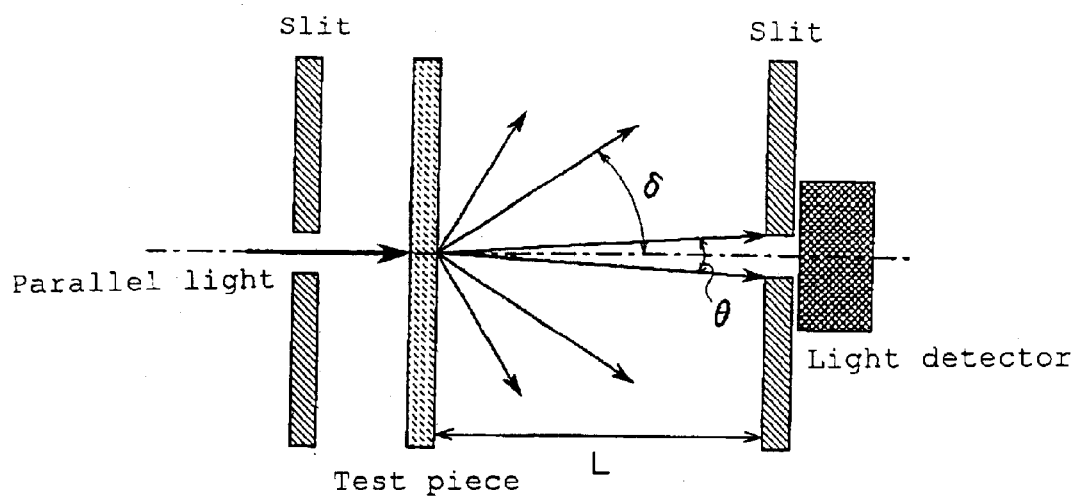
FIG. 7 is a schematic cross-sectional view showing the measurement way of a light transmittance including a straight line light transmission as explained in Example 5.

As is referenced with FIG. 7, the "linear light-transmittance" means a rate of the linearly transmitted light in a less scattered angle δ of 0.5° or less through the translucent ceramic. In other words, it means a light having intensity (IL) transmitted through the ceramic and detected in an aperture angle θ of 1° or lower by a light detector, divided by the light intensity (Io) originally entering the translucent ceramic. The linear light transmittance may be also defined herein as the intensity (IL) of the light not scattering more than 0.5° from a straight-line axis of the light, out from the total intensity light (Io) originally entering the translucent ceramic that scatters in an angle δ of up to 90°.

With respect to the translucent alumina ceramic of the invention, there are no particular restrictions on the porosity or purity so long as the porosity or purity does not cause the grain boundary to form a second boundary layer that varies refractive index at the boundary. If the sintered product satisfies the factors, namely the facet length, the total transmittance and the ratio of the linear transmittance/total transmittance, the translucent alumina ceramic may contain other additives including MgO.

In another major aspect of the invention, there is provided a method for making a translucent polycrystalline ceramic capable of transmitting at least 50% of a light that enters the ceramic when a thickness of the ceramic is 0.5–1 mm, comprising the steps of forming a unfired ceramic body from a mixture powder comprising a crystal powder having a mean particle size of less than 1.0 μm and a purity of at least 99.9%; firing the unfired ceramic body to form a primary sintered product; and applying a hot isostatic pressure to the primary sintered product at a temperature not exceeding by more than 125° C. of the temperature whereat the primary sintered product is fired, so as to form a secondary sintered product having a density close to a theoretical density of the secondary sintered product, and having a mean facet length of less than 700 nm, the mean facet length being defined as an average of lengths of sides forming polygons that appear in cross sections of the crystal particles constituting the ceramic.

A important feature of the above method is control of the mean particle size particles size of the crystal powders as having less than 1 μm by applying the HIP (hot isostatic pressure) so as to have the mean facet length of less than 700 nm in the secondary sintered product and to minimize the refraction index at boundaries of the facets bonded firmly together.

In a preferred embodiment of the invention, there is provided a method for making a translucent polycrystalline ceramic, capable of transmitting a visible light through the ceramic, comprising the steps of forming a unfired ceramic body from a mixture powder comprising a $Al_2O_3$ crystal powder having a mean particle size of less than 0.5 μm and a purity of at least 99.99% and a powder of oxide of metals selected from the metals belonging to IIIA and IVA groups of the Periodic Table excluding Ti; firing the unfired ceramic body to form a primary sintered product having a density of from 3.77 to 3.91 g/cm³; and applying a hot isostatic pressure to the primary sintered product so as to form a secondary sintered product having a density of at least 3.98 g/cm³ and having a mean facet length of less than 700 nm, the mean facet length being defined as an average of lengths of sides forming polygons that appear in cross sections of the crystal particles constituting the ceramic.

In this aspect, the alumina crystal powder in a starting mixture powder is advantageously controlled as having the mean particle size of less than 0.5 μm and the purity of at least 99.99% so that the mean facet length becomes less than 700 nm.

The resultant primary sintered product shows its relative density of from 94.5 to 98.0% and the resultant secondary sintered product has its relative density of at least 99.8% or substantially 100%.

In a preferred additional embodiment of the invention, the firing temperature applied to the unfired ceramic body is from 1225 to 1275° C., the temperature during the hot isostatic pressure is from 1100 to 1250° C. and the hot isostatic pressure is from 500 to 2000 kg/cm².

In another preferred additional embodiment of the invention, the firing temperature applied to the unfired ceramic body is from 1225 to 1360° C., a temperature of the hot isostatic press is from 1100 to 1350° C. and a pressure of the hot isostatic pressure is from 500 to 2000 kg/cm².

The temperature in the HIP treatment is an important factor in controlling the facet length to be less than 700 nm. An amount range of the metal oxide contained in the translucent polycrystalline alumina ceramic becomes critical when the strength and hardness from low temperature to high temperature are required in practical use. In an aspect of the invention, when the amount is less than 0.02 mol %, the strength and/or the hardness at a high temperature of higher than 1000° C. become insufficient in use for e.g. cutting tolls and high temperature plasma windows. When the amount exceeds 2.0 mol %, the metal oxide per se and/or a compound made of the oxide and alumina, may segregate at the grain boundary so as to lower the strength and hardness.

Embodiment

The invention is explained in more detail by the following examples.

EXAMPLE 1

In this example 1, a correlation between the mean particle size and the mean aspect ratio of alumina crystal particles, and also the correlation between the density of the translucent polycrystalline alumina ceramic and the strength/hardness/light-transmittance were investigated.

An alumina powder having a mean particle size of 0.22 μm and a purity of 99.997% (supplied as trade name of TAIMICRON from Taimei Chemical Co.) was ground with water by a wet grinding system having high-purity alumina pebbles of 99.5% purity to form a slurry. After spray-drying the slurry, the dried powder was molded to a unfired ceramic body which was then burned (or fired) at the temperature described as in Table 1 to form a primary sintered product. A HIP treatment was then applied to the primary sintered product at the temperature and under the pressure described in Table 1. The pebbles used therein did not substantially supply any impurities to the slurry according to an analysis conducted later.

The firing of the unfired ceramic body was carried out in an air atmosphere and maintained at the firing temperature for 2 hours. The HIP treatment was maintained in an argon atmosphere for one hour. In test piece 8, the alumina powder was compounded with 0.1 mol % $Nb_2O_5$ and 0.07 mol % $SiO_2$ to 100 mol % alumina powder, to form a mixture which was then fired and sintered in the same process described as above.

On each polycrystalline alumina ceramic product thus obtained, the density (hereafter referred to as "primary density") of the primary sintered product after firing, the density (hereafter referred to as "density after HIP") of the secondary sintered product, the mean particle size and the mean aspect ratio of the alumina crystal particles formed inside the ceramic, and the bending strength, the Vickers hardness, and the light-transmittance of the translucent alumina ceramic at room temperature were measured in the following ways. The results are shown in Table 1 and Table 2.

(1) The Primary Density and the Density After HIP were Measured by an Archimedes Method Defined by JIS R 1634 (and the Measured Value was Rounded According to JIS Z 8401).

(2) The Mean Particle Size and Mean Aspect Ratio of Crystal Particles

The sintered product was mirror-polished, thermally etched and photographed on the polished surface by a scanning electron microphotography. Using the photograph, the sizes of the particles formed in the sintered ceramic product were calculated by an image processing analyzer, and the arithmetic mean values of the maximum lengths (long diameters) of the particles were averaged to be the mean particle size of the alumina crystal particles (grains) formed in the sintered ceramic product. The shortest distance between two straight lines in parallel with a direction along the maximum length (long diameter) was defined as a short diameter of the formed crystal particles. The value of the long diameter divided by the short diameter was defined as an aspect ratio of the formed crystal particle, and the arithmetic mean value of the aspect ratios of all the formed crystal particles was defined as the mean aspect ratio. The number of the measured crystal particles was 500. For reference, the mean particle size of test piece 4 of Table 1 computed by an intercept-method from the scanning electron microphotograph was 0.52 $\mu$m.

(3) Bending Strength of Translucent Polycrystalline Alumina Ceramic

A three-point bending strength was measured at room temperature by using a bending strength test method as described in JIS R 1610.

(4) Hardness of Translucent Polycrystalline Alumina Ceramic

This was measured at a load of 1 kgf (9.807N) by using a Vickers hardness testing method as described in JIS R 1610.

(5) Light-Transmittance Through Translucent Polycrystalline Alumina Ceramic (6) Mean Facet Length The length of every side of the polygon that appears as a cross section of the crystal particles on the polished surface was measured, and the mean value was calculated as the facet length defined in this invention. The number of the alumina crystal particles used in the measurement was at least 100.

(7) Linear Light-transmittance, Total Light Transmittance, and the Ratio Thereof In general, the light transmittance of a light-transmitting translucent ceramics is mostly measured by using an spectrophotometer available in the market (but it may be required to pay an attention to a co-comparison of the measured values with respect to a material having a light diffusion transmittance). For example as shown in FIG. 7, an angular aperture $\theta$ of a detector is defined from the size of the slit (if used a circular slid, the radius r) and a distance L between the slit and a translucent test piece, and the linear transmittance and the total transmittance of the light are measured by the conditions described below.

The transmittance is shown by the following equation (1).

$$\text{Transmittance } T=I/I_0=(1-R)^2\exp(-\mu X) \tag{1}$$

(wherein, $I_0$=incident light intensity, I=transmitted light intensity, R=reflectance, X=thickness of test piece, $\mu$=apparent absorption coefficient.)

(8) High-temperature Bending Strength

A three point bending strength was measured at 1000° C. and 1200° C. by the bending strength test method determined by JIS R 1604.

(9) High-temperature Hardness

A Vickers Hardness at 1000° C. was measured in vacuum at a load of 1 kgf (9.807 N) by the Vickers bending strength test method determined by JIS R 1623.

TABLE 1

| Test pieces | Additive | Additive Amount (mol %) | Firing Temp. (° C.) | Primary Density (g/cm³) | Relative Density (%) | HIP Temp. (° C.) | HIP pressure (kg/cm³) | Density After HIP (g/cm³) | Relative Density After HIP |
|---|---|---|---|---|---|---|---|---|---|
| *1 | none | — | 1200 | 3.73 | 93.5 | 1200 | 1000 | 3.75 | 94.0 |
| 2 | none | — | 1240 | 3.81 | 95.4 | 1200 | 1000 | 3.99 | 100.0 |
| 3 | none | — | 1250 | 3.86 | 96.7 | 1150 | 2000 | 3.99 | 100.0 |
| 4 | none | — | 1250 | 3.86 | 96.7 | 1200 | 1000 | 3.99 | 100.0 |
| 5 | none | — | 1270 | 3.88 | 97.2 | 1200 | 1000 | 3.99 | 100.0 |
| *6 | none | — | 1300 | 3.96 | 99.2 | 1200 | 1000 | 3.99 | 100.0 |
| *7 | none | — | 1400 | 3.97 | 99.5 | 1200 | 1000 | 3.99 | 100.0 |
| *8 | Nb$_2$O$_5$ SiO$_2$ | 0.10 0.07 | 1400 | 3.89 | 97.5 | 1300 | 1000 | 3.96 | 100.0 |

Mark (*) indicates test pieces not so satisfying objects of the invention.

Figure 5:
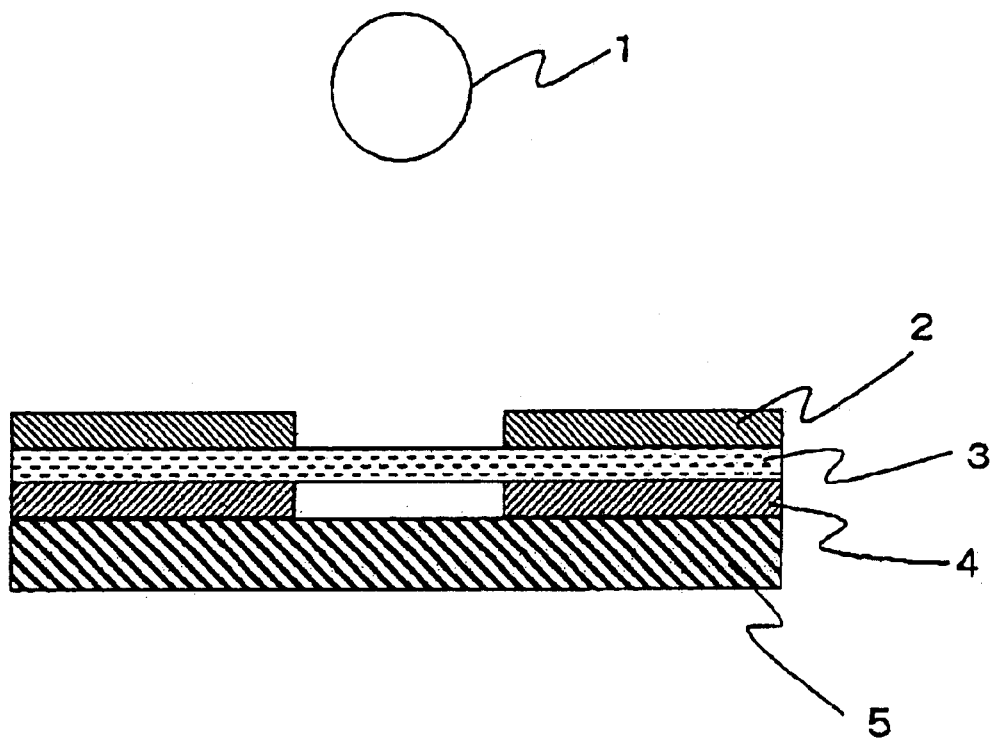
FIG. 5 is a schematic cross-sectional view showing a measurement way for a light transmittance through a translucent ceramic as explained in Example 1.

As referred in FIG. 5, the ceramic sample 3 prepared and polished so as to have its thickness of 1 mm was inserted between slits 2, 4 having a square opening of 10 mm×10 mm, and then they were placed on an illuminance meter 5 ("LUXMETER LX1334", manufactured by Custom K.K.) to be irradiated by a light from a halogen lamp 1 (having color temperature of 5500 K). A illuminance measured without the sample testpiece on the illuminance meter was defined as 100, the illuminance measured by completely shutting the light was defined as 0. As shown in FIG. 5, the illuminance with the sample 3 placed on the meter was determined as an intensity of the light-transmittance through the ceramic.

TABLE 2

| Test piece | Mean Particle Size ($\mu$m) | Mean Aspect ratio | Bending Strength (MPa) | Hardness (HV1) | Light-transmittance (%) (1 mm. thickness) |
|---|---|---|---|---|---|
| *1 | — | — | — | — | — |
| 2 | 0.52 | 1.32 | 860 | 2130 | 70 |
| 3 | 0.52 | 1.30 | 870 | 2140 | 70 |
| 4 | 0.54 | 1.37 | 870 | 2140 | 65 |
| 5 | 0.55 | 1.35 | 850 | 2105 | 60 |
| *6 | 1.20 | 1.40 | 680 | 1950 | 40 |

TABLE 2-continued

| Test piece | Mean Particle Size (μm) | Mean Aspect ratio | Bending Strength (MPa) | Hardness (HV1) | Light-transmittance (%) (1 mm. thickness) |
|---|---|---|---|---|---|
| *7 | 1.77 | 1.38 | 620 | 1900 | 10 |
| *8 | 2.31 | 2.52 | 660 | 1750 | white turbid |

Mark (*) indicates test pieces not so satisfying objects of the invention.

The density of test piece 1 was so low that measurements therefor were not carried out.

The value of light transmittance in Table 2 means a rate in percentage of the total light (I) transmitted through the translucent ceramic of 1 mm in thickness by comparing (dividing) the total light (Io) entered into the translucent ceramic measured without any interference of the sample 3, being determined with the illuminance meter (5) as shown in FIG. 5.

From the test results of Table 1 and Table 2, as seen by test pieces 2–5 having the mean particle sizes of from 0.5 to 0.6 μm, the mean aspect ratios of from 1.3 to 1.4, and the densities of 3.99 g/cm³, the translucent alumina ceramic product having a high bending strength and hardness are obtained. Furthermore, high values of from 60 to 70% in the light-transmittance were obtained.

EXAMPLE 2

In this Example 2, the surface of each sintered product was polished, and the extent of particles falling off from the surface and the surface roughness thereof after polishing was evaluated.

A surface of test pieces made a dimension of 6 (width)×20 (length)×4 (height) mm from the test pieces 4, 5, 7, and 8 of Table 1 and Table 2 was polished by the condition (1) below. Then after polishing by the condition (2) below, the optical microphotographs on the polished surface were taken at 100–400 magnifications from at least three visual scopes, and then the areas of the particle-fallen off portions in the visual scopes were measured. The area ratio to the total polished area was calculated. For measurement of the area of the particles fallen off, an image analyzer can be used. The results are shown in Table 3.

(1) Wet polishing by using water and abrasives having particle size of about 45 μm formed on with a diamond wheel (SD D45 J 100 B) for a period of 10 minutes.

(2) Wet polishing by using oil and diamond abrasives having particle size of 3 μm on pan cloth for the period of 10 minutes.

Figure 1:
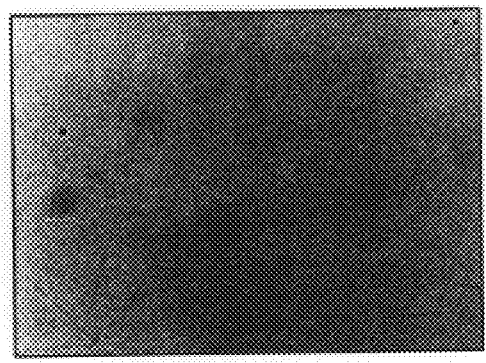
FIG. 1 is an enlarged optical microphotograph of a polished surface of a translucent polycrystalline ceramic of a test piece 4 in Example 2, the ceramic satisfying an object of the invention.
Figure 2:
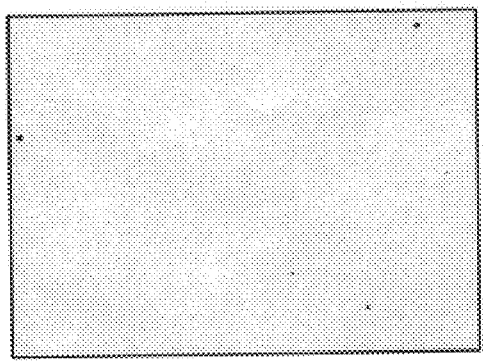
FIG. 2 is a view explaining an image emphasizing particles-fallen off portions shown in FIG. 1 with emphasis of two dradated contrast by using an image processing analyzer.
Figure 3:
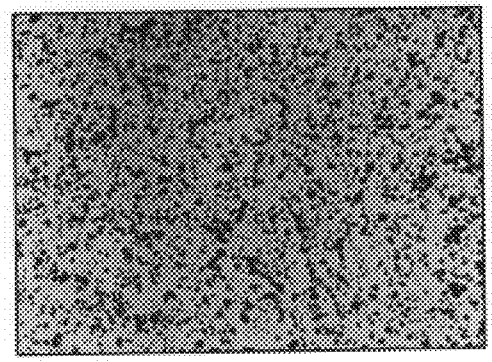
FIG. 3 is an enlarged optical microphotograph of a polished surface of a translucent polycrystalline ceramic of a test piece 7 in Example 2, the ceramic not so satisfying an object of the invention.
Figure 4:
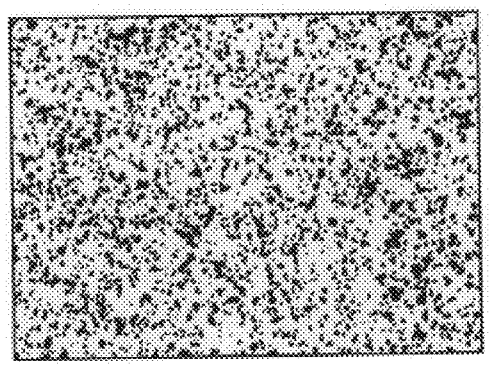
FIG. 4 is a view explaining an image emphasizing article-fallen off portion shown in FIG. 3 with emphasis of two-dradated contrast by using an image processing analyzer.

The optical microphotograph (100 magnifications) of the polished surface of test piece 4 is shown in FIG. 1. The black portions of the photograph are particle-fallen off portions. The image emphasizing the particle-fallen off portions by an image processing with emphasis of two-dradated contrast is shown in FIG. 2. The optical microphotograph (100 magnifications) of the polished surface of Test piece 7 is shown in FIG. 3 and its image emphasizing the particle-fallen off portions by the image processing with emphasis of two-dradated contrast is shown in FIG. 4.

The surface roughness of each sintered product after polishing was measured by a surface roughness measurement apparatus (using a trace-system surface roughness meter regulated by JIS B 0651) and Ra and Rmax according to JIS B 0601 were obtained. At the measurement, a stylus having a tip radius of 5 μm was used. The results are shown in Table 3.

TABLE 3

| Test piece | Area ratio (%) of particle fallen off portion | Surface roughness after polishing Ra (μm) | Rmax (μm) |
|---|---|---|---|
| 4 | 0.02 | 0.004 | 0.077 |
| 5 | 0.04 | 0.005 | 0.079 |
| *7 | 20.56 | 0.033 | 0.749 |
| *8 | 4.27 | 0.021 | 0.504 |

Mark (*) indicates test pieces not so satisfying an object of the invention.

From the results of Table 3, it can be seen that the test pieces (4) and (5) have a very smooth surfaces. On the other hand, in test piece 7, the area ratio of the particle-fallen off portions was about 20% and in test piece 8, the particles was considerably fallen off to be as about 4% of the area ratio. Also, it can be seen that in test pieces 7 and 8, Ra was at least at least 0.02 μm and Rmax was at least 0.50 μm.

EXAMPLE 3

In this Example 3, the abrasion resistance of each secondary sintered ceramic product of Example 2 was evaluated.

The abrasion resistance was evaluated by an abrasion loss (expressed as "abraded depth" in Table 4). The abrasion loss was measured by pushing the sintered ceramic product to a diamond wheel plale (SD D45 J 100 B) having a particle size of 45 μm with a plane pressure of 1 kg/cm² for 5 minutes. This abrasion test was carried out with water. The size of the test piece was 6 (width)×20 (length)×4 (height) mm. The test results are shown in Table 4.

EXAMPLE 4

In this Example 4, the durability to a contact stress, of the each secondary sintered ceramic product of Example 2 was evaluated.

A surface injury caused by pushing a steel ball having a diameter of 3.8 inch to the polished surface of the sintered ceramic product was checked so as to determine the minimum load that causes the injury such as a crack, with the load increasing. The results are shown in Table 4. The load was increased to 500 kgf and when any injury does not occur at the surface, the case was determined as more than 500 as shown in Table 4.

TABLE 4

| Test piece | Abraded depth (μm) | Injury-occurred load (kgf) |
|---|---|---|
| 4 | 15 | >500 |
| 5 | 18 | >500 |
| *7 | 320 | 400 |
| *8 | 390 | 20 |

Mark (*) indicates test pieces not so satisfying an object of the invention.

From the results of Table 4, it can be seen that since abraded depths formed on the test pieces (4) and (5) are only about from 15 to 18 μm, and the secondary sintered products have excellent abrasion resistance.

In addition, it can be also seen by the test pieces (4) and (5) that since the injury-occurred load is more than 500 kgf, and the durability to the contact stress is also outstandingly high. The translucent alumina ceramic according to the invention finds various uses such as bearing (including balls), sliding members and cutting tools to which is applied a large contact stress.

EXAMPLE 5

In this Example 5, a correlation between the mean facet length of alumina crystal particles sintered in the translucent polycrystalline ceramic and the light-transmittance through the translucent polycrystalline ceramic was investigated.

An alumina powder having the same mean particle size and purity as described in Example 1 was mixed with each of additives of metal oxides as shown in Table 5, so as to form a molded (or unfired) body. Then the unfired body was burned (or fired) at a temperature described in Table 5, so as to make a primary sintered product to which thereafter was applied the HIP at the temperature and under the pressure respectively described in Table 5. Other conditions were the same as in Example 1.

On each translucent alumina ceramic thus obtained, the primary density and the density after the HIP treatment were measured as in Example 1, and further, the mean facet length of the alumina crystal particles formed inside the ceramic, the total light-transmittance, the linear light-transmittance of the translucent alumina ceramic and the ratio (linear light-transmittance/total light-transmittance) were measured, by the way as also described in Example 1. Each of the sintered products was mirror polished and, after applying thermal etching on surfaces thereof, a scanning electron microphotograph was taken on the surface. From the photograph, the mean particle size and the mean aspect ratio of the sintered $Al_2O_3$ crystal particles formed therein were calculated by the intercept method, based on at least 100 pieces of the particles. The results are shown in Table 5 and Table 6.

Light-Transmittance Measuring Condition

Light source: Halogen lamp (emitting white light with color temperature of 3100 K) equipped with a infrared cut filter (cutting wavelengths of more than 800 nm).

Linear transmittance: L=500 mm, r=3 mm (θ=1°)

Total transmittance: L=<1 mm, r=10 mm (θ=90°)

Thickness of test piece=0.5 mm.

Surface state of test piece: In order to remove influences caused by reflection and scattering at the surface and to determine the characteristics of the material perse; the flat surfaces of the test piece is mirror-polished such that Ra becomes 0.02 μm or less.

TABLE 6

| Test piece | Mean Particle Size (μm) | Mean facet length (nm) | Total Transmittance (%) | Linear Transmittance (%) | Linear transmittance/ total transmittance (%) |
|---|---|---|---|---|---|
| 4 | 0.54 | 330 | 72 | 23 | 32 |
| 9 | 0.50 | 300 | 75 | 40 | 53 |
| 10 | 0.52 | 270 | 78 | 42 | 54 |
| 11 | 0.50 | 250 | 78 | 27 | 35 |
| 12 | 0.48 | 220 | 73 | 25 | 34 |
| *13 | 4.00 | 2200 | 79 | 4 | 5 |

Thickness of test piece: 0.5 mm)
Mark (*) indicates test pieces not so satisfying an object of the invention.

As is seen from Tables 5 and 6, when the mean facet length drastically decreases, compared to test piece 13, a ratio of linear transmittance to total transmittance which indicates a state of transparency of the ceramic becomes outstandingly high as 0.3 (30%)–0.6(60%).

EXAMPLE 6

In the Example 6, a correlation of the kind and amount of the metal oxide contained in the translucent alumina ceramic with the strength and the hardness thereof at each temperature was investigated.

An alumina powder having a mean particle size of 0.22 μm and a purity of at least 99.99% was mixed with a variety of raw material powder as shown in Table 7 was prepared as in the Example 1 to form unfired ceramic bodies, and the bodies was fired at the temperature described in Table 7. To the primary sintered product was applied the HIP at the temperature with the pressure described in Table 7. Other conditions for the firing and the HIP treatment were the same as in Example 1.

On each of the translucent alumina ceramics thus attained, the primary density, the density after the HIP, and the bending strength and the Vickers hardness of the translucent alumina ceramic at room temperature were measured in a similar way as explained in Example 1, and further, the bending strength and the Vickers hardness at a high temperature were measured by the method described below. The sintered product was mirror polished, and after applying thereto thermal etching, a scanning electron microphotograph was taken on the surface. From the photograph, the mean particle size of the alumina crystal particles was computed by the intercept method. The results are shown in Tables 7 and 8.

TABLE 5

| Test piece | Additive | Additive Amount (mol %) | Firing Temperature (° C.) | Primary Density (g/cm³) | Relative Density (%) | HIP Temp. (° C.) | HIP pressure (kg/cm³) | Density After HIP (g/cm³) | Relative Density After HIP |
|---|---|---|---|---|---|---|---|---|---|
| 4 | none | — | 1250 | 3.86 | 96.7 | 1200 | 1000 | 3.99 | 100.0 |
| 9 | MgO | 0.10 | 1240 | 3.86 | 96.7 | 1200 | 1000 | 3.99 | 100.0 |
| 10 | $Y_2O_3$ | 0.05 | 1320 | 3.82 | 95.7 | 1300 | 1000 | 3.99 | 100.0 |
| 11 | $Yb_2O_3$ | 0.05 | 1320 | 3.86 | 96.7 | 1300 | 1000 | 3.99 | 100.0 |
| 12 | $ZrO_2$ | 0.05 | 1280 | 3.85 | 96.5 | 1270 | 1000 | 3.99 | 100.0 |
| *13 | none | — | 1250 | 3.86 | 96.7 | 1500 | 1000 | 3.99 | 100.0 |

Mark (*) indicates test pieces not so satisfying an object of the invention.

TABLE 7

| Test piece | Additive | Additive Amount (mol %) | Firing Temperature (° C.) | Primary Density (g/cm³) | Relative Density (%) | HIP Temp. (° C.) | HIP pressure (kg/cm³) | Density After HIP (g/cm³) | Relative Density After HIP |
|---|---|---|---|---|---|---|---|---|---|
| 10 | $Y_2O_3$ | 0.05 | 1320 | 3.82 | 95.7 | 1300 | 1000 | 3.99 | 100.0 |
| 11 | $Yb_2O_3$ | 0.05 | 1320 | 3.86 | 96.7 | 1300 | 1000 | 3.99 | 100.0 |
| 12 | $ZrO_2$ | 0.05 | 1280 | 3.85 | 96.5 | 1270 | 1000 | 3.99 | 100.0 |
| 14 | $Sc_2O_3$ | 0.05 | 1240 | 3.84 | 96.2 | 1200 | 1000 | 3.99 | 100.0 |
| 15 | $La_2O_3$ | 0.05 | 1340 | 3.87 | 97.0 | 1300 | 1000 | 3.99 | 100.0 |
| 16 | $Dy_2O_3$ | 0.05 | 1320 | 3.83 | 96.0 | 1300 | 1000 | 3.99 | 100.0 |
| 17 | $Lu_2O_3$ | 0.05 | 1320 | 3.88 | 97.2 | 1300 | 1000 | 3.99 | 100.0 |
| 18 | $Yb_2O_3$ | 0.02 | 1280 | 3.87 | 97.0 | 1270 | 1000 | 3.99 | 100.0 |
| 19 | $Yb_2O_3$ | 0.20 | 1320 | 3.83 | 95.8 | 1300 | 1000 | 4.00 | 100.0 |
| 20 | $Yb_2O_3$ | 1.00 | 1340 | 3.88 | 95.3 | 1300 | 1000 | 4.07 | 100.0 |
| 21 | $Yb_2O_3$ | 2.00 | 1360 | 4.09 | 98.3 | 1340 | 1000 | 4.16 | 100.0 |
| 22 | $Y_2O_3$ | 0.20 | 1320 | 3.85 | 96.3 | 1270 | 1000 | 4.00 | 100.0 |
| 23 | $Dy_2O_3$ | 0.20 | 1320 | 3.86 | 96.5 | 1270 | 1000 | 4.00 | 100.0 |
| *4 | none | — | 1250 | 3.86 | 96.7 | 1200 | 1000 | 3.99 | 100.0 |
| *9 | MgO | 0.10 | 1240 | 3.86 | 96.7 | 1200 | 1000 | 3.99 | 100.0 |
| *24 | $TiO_2$ | 0.10 | 1240 | 3.86 | 96.7 | 1200 | 1000 | 3.99 | 100.0 |
| *25 | $Yb_2O_3$ | 0.01 | 1280 | 3.87 | 97.0 | 1270 | 1000 | 3.99 | 100.0 |
| *26 | $Yb_2O_3$ | 3.00 | 1380 | 4.16 | 98.1 | 1340 | 1000 | 4.24 | 100.0 |

Mark (*) indicates test pieces not so satisfying an object of the invention.

TABLE 8

| Test piece | Additive | Additive Amount (mol %) | Mean particle size (μm) | Three point bending strength (MPa) Room Temperature | 1000° C. | 1200° C. | Hardness (HV1) Room Temperature | 1000° C. |
|---|---|---|---|---|---|---|---|---|
| 10 | $Y_2O_3$ | 0.05 | 0.52 | 830 | 590 | 520 | 2120 | 970 |
| 11 | $Yb_2O_3$ | 0.05 | 0.50 | 860 | 610 | 560 | 2110 | 980 |
| 12 | $ZrO_2$ | 0.05 | 0.48 | 820 | 580 | 550 | 2110 | 920 |
| 14 | $Sc_2O_3$ | 0.05 | 0.52 | 850 | 590 | 560 | 2110 | 980 |
| 15 | $La_2O_3$ | 0.05 | 0.53 | 840 | 590 | 550 | 2100 | 930 |
| 16 | $Dy_2O_3$ | 0.05 | 0.48 | 830 | 590 | 550 | 2110 | 930 |
| 17 | $Lu_2O_3$ | 0.05 | 0.49 | 830 | 590 | 550 | 2110 | 980 |
| 18 | $Yb_2O_3$ | 0.02 | 0.48 | 840 | 590 | 560 | 2110 | 850 |
| 19 | $Yb_2O_3$ | 0.20 | 0.50 | 860 | 600 | 560 | 2170 | 1090 |
| 20 | $Yb_2O_3$ | 1.00 | 0.49 | 860 | 610 | 570 | 2170 | 1100 |
| 21 | $Yb_2O_3$ | 2.00 | 0.48 | 810 | 560 | 500 | 2010 | 910 |
| 22 | $Y_2O_3$ | 0.20 | 0.49 | 870 | 580 | 550 | 2110 | 1040 |
| 23 | $Dy_2O_3$ | 0.20 | 0.49 | 860 | 580 | 550 | 2120 | 1040 |
| *4 | none | — | 0.54 | 870 | 580 | 230 | 2140 | 750 |
| *9 | MgO | 0.10 | 0.50 | 860 | 580 | 240 | 2120 | 770 |
| *24 | $TiO_2$ | 0.10 | 0.52 | 840 | 590 | 230 | 2120 | 770 |
| *25 | $Yb_2O_3$ | 0.01 | 0.49 | 850 | 580 | 240 | 2110 | 790 |
| *26 | $Yb_2O_3$ | 3.00 | 0.48 | 740 | 490 | 400 | 1920 | 820 |

Mark (*) indicates test pieces not so satisfying an object of the invention.

As is seen from test pieces (10) to (12) and (14) to (23) in Tables 7 and 8, they are high and excellent in the strength and the hardness not only at room temperature but also at 1000° C.–1200° C.

EXAMPLE 7

In this Example 7, a test, whether the translucent polycrystalline alumina ceramic can be used for a cutting tool tip, was conducted.

The cutting tool tips were made from the translucent alumina ceramic products that were prepared in a similar way as described in previous Examples so as to have the sintered ceramic made from the alumina particles and metal oxide as shown in Table 9.

The sintered products were shaped to cutting tool tips (SNN434-TNF) which were tested under the following cutting condition. Test results are shown in Table 10.

[Cutting Test Condition]

Lubricant: nothing (dry),

Metal work to cut: cast iron,

Cutting Speed: 1000 m/min., feed=0.3 mm/rev.

Cutting depth: 2 mm,

Holder for tip: C16L-44

For additional reference, the total light-transmittance of the translucent polycrystalline alumina ceramic products was checked by the same way as described in Example 1. The checked ceramic products were 0.5 mm in thickness and mirror-polished (Ra<0.02 μm). The data are shown in Table 10.

As is confirmed by the data as shown in Table 10, the translucent polycrystalline $Al_2O_3$ ceramic containing the additive oxide of metal according to the invention, can perform excellently when it is used as a cutting tool material.

TABLE 9

| Test piece | Additive | Additive Amount (mol %) | Firing Temp. (° C.) | Primary Density (g/cm³) | HIP Temp. (° C.) | HIP pressure (g/cm³) | Density After HIP (g/cm³) | Relative Density After HIP |
|---|---|---|---|---|---|---|---|---|
| 11 | Yb₂O₃ | 0.05 | 1320 | 3.86 | 1300 | 1000 | 3.99 | 100.0 |
| 27 | Yb₂O₃ | 0.05 | 1320 | 3.86 | 1360 | 1000 | 3.99 | 100.0 |
| 28 | ZrO₂ | 2.6 | 1550 | 3.96 | 1450 | 1500 | 4.03 | 99.8 |
| 29 | ZrO₂ | 7.3 | 1550 | 4.02 | 1450 | 1500 | 4.10 | 99.8 |

TABLE 10

| Test piece | Additive | Additive Amount (mol %) | Mean particle size (μm) | Strength (MPa) Room Temperature | Strength (MPa) 1000° C. | Hardness (HV1) Room Temperature | Hardness (HV1) 1200° C. | Cutting distance (m) | Total Transmit-tance (%) |
|---|---|---|---|---|---|---|---|---|---|
| 11 | Yb₂O₃ | 0.05 | 0.50 | 860 | 560 | 2110 | 980 | 1293 | 78 |
| 27 | Yb₂O₃ | 0.05 | 1.00 | 790 | 500 | 1980 | 930 | 871 | 80 |
| 28 | ZrO₂ | 2.60 | 1.50 | 690 | ? | 1640 | 690 | 26 | 25 |
| 29 | ZrO₂ | 7.30 | 1.00 | 740 | ? | 1700 | 740 | 619 | 2 |

This application is based on Japanese Patent Application Nos. Hei 11-138683, Hei 11-374797, and 2000-62627, filed May 19, 1999, Dec. 28, 1999, and Mar. 7, 2000, respectively, which are incorporated herein by reference in their entireties.

What is claimed is:

1. A translucent polycrystalline ceramic capable of transmitting a light through the ceramic, comprising crystal particles, wherein
 a mean facet length of the crystal particles is not longer than a maximum wave length of the light that transmits through the polycrystalline ceramic product; and
 the mean facet length being defined as an average of lengths of sides forming polygons that appear in cross sections of the crystal particles constituting the ceramic, said translucent polycrystalline ceramic further comprising:
 a metal oxide of one or more metals selected from the group consisting of metals belonging to Groups IIIA and IVA excluding Ti in an amount of 0.2–2.0% in molarity, the oxide binding the crystal particles inside the ceramic.

2. A translucent polycrystalline ceramic as claimed in claim 1, wherein
 substantially all of the facet lengths of the crystal particles are not longer than the maximum wave length of the light that transmits through the ceramic; and
 the facet length being defined as a length of a side of the polygon that appears in a cross section of the crystal particle contained in the ceramic.

3. A translucent polycrystalline ceramic as claimed in claim 1, wherein
 a mean crystal particle size of the crystal particles is not larger than 1 μm; and
 a mean aspect ratio of the crystal particles is from 1 to 1.5.

4. A translucent polycrystalline ceramic as claimed in claim 1, wherein the crystal particles are made from Al₂O₃.

5. A translucent polycrystalline ceramic as claimed in claim 4, wherein
 the mean facet length of the crystal particles is not longer than 700 nm;
 a density of the translucent polycrystalline ceramic is not less than 3.98 g/cm³;
 a bending strength of the translucent polycrystalline ceramic is more than 750 MPa; and
 a Vickers hardness of the translucent polycrystalline ceramic is more than 1900.

6. A translucent polycrystalline ceramic as claimed in claim 1, wherein
 the metal oxide is one or more selected from the group of Y₂O₃, Yb₂O₃, ZrO₂, Sc₂O₃, La₂O₃, Dy₂O₃ and Lu₂O₃.

7. A translucent polycrystalline ceramic as claimed in claim 1, wherein the oxide of the metal is Y₂O₃, Yb₂O₃ or a mixture thereof.

8. A translucent polycrystalline ceramic as claimed in claim 4, wherein the polycrystalline ceramic does not substantially contain magnesia (MgO).

9. A translucent polycrystalline ceramic as claimed in claim 4, wherein
 the mean particle size of the crystal particles is 0.3–1.0 μm;
 a bending strength of the translucent polycrystalline ceramic is at least 500 MPa measured at a temperature of 1000° C.; and
 a Vickers Hardness of the translucent polycrystalline ceramic is at least 850 measured at a temperature of 1000° C.

10. A translucent polycrystalline ceramic as claimed in claim 1 or 4, wherein
 more than 50% of the light having a wave length of 380–780 nm can transmit through the translucent polycrystalline ceramic when the translucent polycrystalline ceramic has a thickness of 1 mm.

11. A translucent polycrystalline ceramic as claimed in claim 1 or 4, wherein more than 60% of the light having a wave length of 380–780 nm can transmit through the translucent polycrystalline ceramic when the translucent polycrystalline ceramic has a thickness of 0.5 mm.

12. A translucent polycrystalline ceramic as claimed in claim 4, having a straight-line light transmission ratio of at least 0.3 (or 30% in percent), wherein the straight-line light transmission ratio is determined by dividing an intensity of the light transmitted through the ceramic without scattering more than 0.5 degree by the intensity of the light entering the ceramic, the ceramic being 0.5 mm in thickness and the light having a wave length of 380–780 mm.

13. A translucent polycrystalline ceramic as claimed in claim 4, wherein
   a surface of the translucent polycrystalline ceramic is polished to an extent that a center line mean surface roughness (Ra) is from 0.002 to 0.020 µm and a maximum height (Rmax) of the surface roughness is less than 0.30 µm in the polished surface of the translucent polycrystalline ceramic.

14. A translucent polycrystalline ceramic as claimed in claim 4, wherein
   the translucent polycrystalline ceramic is polished, and a ratio of an empty surface area caused by the alumina particles fallen off to a total polished surface area is not higher than 1%.

15. An outer tube of a sodium lamp comprising the translucent polycrystalline ceramic as claimed in claim 4.

16. A cutting tool having an edge formed by a rake face and a flank face comprising the translucent polycrystalline ceramic as claimed in claim 4.

17. An electronic component for use in high frequency applications comprising the translucent polycrystalline ceramic as claimed in claim 4.

18. A bearing comprising the translucent polycrystalline ceramic as claimed in claim 4.

19. A translucent polycrystalline ceramic as claimed in claim 4, wherein the ceramic is colorless.

20. A method for making a translucent polycrystalline ceramic capable of transmitting at least 50% of a light that enters the ceramic when a thickness of the ceramic is 1 mm, comprising the steps of:
   forming an unfired ceramic body from a mixture powder including a crystal powder having a mean particle size of less than 1.0 µm and a purity of at least 99.9%;
   firing the unfired ceramic body to form a primary sintered product; and
   applying a hot isostatic pressure to the primary sintered product at a temperature not exceeding by more than 125° C. of the temperature wherein the primary sintered product is fired so as to form a secondary sintered product having a density close to a theoretical density of the secondary sintered product and having a mean facet length of less than 700 nm, the mean facet length being defined as an average of lengths of sides forming polygons that appear in cross sections of the crystal particles constituting the ceramic.

21. A method for making a translucent polycrystalline ceramic capable of transmitting a visible light through the ceramic comprising the steps of:
   forming an unfired ceramic body from a mixture powder comprising an $Al_2O_3$ crystal powder having a mean particle size of less than 0.5 µm and a purity of at least 99.99% and a powder of oxide of metals selected from the metals belonging to IIIA and IVA groups of the Periodic Table excluding Ti;
   burning the unfired ceramic body to form a primary sintered product having a density of from 3.77 to 3.91 g/cm$^3$; and
   applying a hot isostatic pressure to the primary sintered product so as to form a secondary sintered product having a density of at least 3.98 g/cm$^3$ and having a mean facet length of less than 700 nm, the mean facet length being defined as an average of lengths of sides forming polygons that appear in cross sections of the crystal particles constituting the ceramic.

22. A method of making a translucent polycrystalline ceramic as claimed in claim 20 or 21, wherein
   the primary sintered product has a relative density of from 94.5 to 98.0% and the secondary sintered product has a relative density of at least 99.8%.

23. A method of making a translucent polycrystalline alumina ceramic as claimed in claim 20 or 21, wherein
   the primary sintered product has a relative density of from 94.5 to 98.0% and the secondary sintered product has a relative density of substantially 100%.

24. A method of making a translucent alumina ceramic as claimed in claim 20 or 21, wherein
   a firing temperature applied to the unfired ceramic body is from 1225 to 1275° C., a temperature during the hot isostatic pressure is from 1100 to 1250° C. and the hot isostatic pressure is from 500 to 2000 kg/cm$^2$.

25. A method of making a translucent polycrystalline ceramic as claimed in claim 20 or 21, wherein
   a firing temperature applied to the unfired ceramic body is from 1225 to 1360° C., a temperature of the hot isostatic press is from 1100 to 1350° C. and a pressure of the hot isostatic pressure is from 500 to 2000 kg/cm$^2$.

26. A method of making translucent polycrystalline ceramic as claimed in claim 21, wherein
   the $Al_2O_3$ crystal powder has its purity of more than 99.99%.

* * * * *